(12) United States Patent
Horvath et al.

(10) Patent No.: US 7,661,917 B2
(45) Date of Patent: Feb. 16, 2010

(54) THREE PIECE GARAGE HOOK

(75) Inventors: John F. Horvath, Hoffman Estates, IL (US); Keith R. Christiansen, Naperville, IL (US); Richard J. Ernst, San Diego, CA (US)

(73) Assignee: Illinois Tool Works, Inc., Glenview, IL (US)

( * ) Notice: Subject to any disclaimer, the term of this patent is extended or adjusted under 35 U.S.C. 154(b) by 72 days.

(21) Appl. No.: 11/148,159

(22) Filed: Jun. 8, 2005

(65) Prior Publication Data

US 2006/0024144 A1  Feb. 2, 2006

Related U.S. Application Data

(63) Continuation-in-part of application No. 10/939,795, filed on Sep. 13, 2004, now Pat. No. 7,160,074, and a continuation-in-part of application No. 10/844,706, filed on May 12, 2004.

(60) Provisional application No. 60/510,708, filed on Oct. 10, 2003.

(51) Int. Cl.
*F16B 45/00* (2006.01)
(52) U.S. Cl. .................. 411/400; 248/304; D6/553
(58) Field of Classification Search .................. 411/411, 411/401; 248/304, 546, 217; D6/512, 553, D6/554, 567
See application file for complete search history.

(56) References Cited

U.S. PATENT DOCUMENTS

| 441,266 | A | * | 11/1890 | Voltz | 248/110 |
| 809,017 | A | * | 1/1906 | Schreyer | 248/304 |
| 861,814 | A | * | 7/1907 | Chain | 248/110 |
| 1,272,265 | A | * | 7/1918 | Horn | 248/110 |
| 1,452,745 | A | * | 4/1923 | Landan | 248/217.3 |

(Continued)

FOREIGN PATENT DOCUMENTS

DE    040 16 724    11/1991

(Continued)

OTHER PUBLICATIONS

ASM Handbooks Online, "Zinc Alloy Casting", 2002.*

(Continued)

*Primary Examiner*—Flemming Saether
(74) *Attorney, Agent, or Firm*—Mark W. Croll; Christopher P. Rauch; Beem Patent Law Firm

(57) ABSTRACT

In one aspect, a holder mountable to a friable substrate may include a self-drilling drywall fastener, a wall engaging base plate having an opening for receiving a fastener, and at least one leg extending from the base plate for holding an object. In another aspect, a holder may include a self-drilling drywall fastener having a drilling portion longer than a drywall thickness followed by a high-threaded portion, a wall engaging base plate, and at least one leg for holding an object. In still another aspect, a holder may include a self-drilling drywall fastener having a screw-like drilling portion longer than a drywall thickness followed by a high-threaded portion, a drywall engaging base plate having a recess for receiving a rotary driver and a pair of openings each capable of receiving a threaded drywall fastener and engaging threads thereof.

20 Claims, 8 Drawing Sheets

U.S. PATENT DOCUMENTS

| | | | |
|---|---|---|---|
| 2,275,007 A * | 3/1942 | Caestecker | 248/205.1 |
| 2,441,051 A * | 5/1948 | Wilhelm | 248/110 |
| 2,883,720 A | 4/1959 | Hansen | |
| 3,641,866 A | 2/1972 | Mortensen | |
| D256,302 S * | 8/1980 | Moore, Sr. | D6/552 |
| 4,283,034 A * | 8/1981 | Sheehan | 248/263 |
| 4,441,619 A | 4/1984 | Gibitz | |
| D274,487 S * | 7/1984 | Eads et al. | D8/356 |
| D281,576 S * | 12/1985 | Akers | D8/373 |
| 4,601,625 A | 7/1986 | Ernst et al. | |
| 4,763,456 A | 8/1988 | Giannuzzi | |
| D305,431 S * | 1/1990 | Adams | D8/367 |
| 4,892,429 A | 1/1990 | Giannuzzi | |
| D310,760 S * | 9/1990 | Murphy | D6/515 |
| 5,039,262 A | 8/1991 | Giannuzzi | |
| 5,160,225 A | 11/1992 | Chern | |
| 5,190,425 A | 3/1993 | Wieder et al. | |
| 5,234,299 A | 8/1993 | Giannuzzi | |
| 5,308,203 A | 5/1994 | McSherry et al. | |
| 5,372,346 A * | 12/1994 | Upchurch et al. | 248/304 |
| D357,405 S * | 4/1995 | Philippi | D8/373 |
| 5,449,257 A | 9/1995 | Chiannuzzi | |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,625,994 A | 5/1997 | Giannuzzi | |
| 5,692,864 A | 12/1997 | Powell et al. | |
| 5,752,792 A | 5/1998 | McSherry | |
| 5,833,415 A | 11/1998 | McSherry | |
| 5,882,162 A | 3/1999 | Kaneko | |
| 5,944,295 A * | 8/1999 | McSherry | 248/304 |
| 5,991,998 A | 11/1999 | Kaneko | |
| 6,079,921 A | 6/2000 | Gauthier et al. | |
| 6,139,236 A | 10/2000 | Ito | |
| 6,186,716 B1 | 2/2001 | West et al. | |
| 6,196,780 B1 | 3/2001 | Wakai et al. | |
| D443,160 S * | 6/2001 | Ernst | D6/553 |
| 6,250,865 B1 | 6/2001 | McSherry | |
| 6,354,779 B1 | 3/2002 | West et al. | |
| 6,382,892 B1 | 5/2002 | Hempfling | |
| 6,419,436 B1 | 7/2002 | Gaudron | |
| 6,464,189 B1 * | 10/2002 | Yu | 248/323 |
| 6,676,350 B1 | 1/2004 | McSherry et al. | |
| 6,679,661 B2 | 1/2004 | Huang | |
| 6,830,228 B2 | 12/2004 | Ernst | |
| 6,846,142 B2 | 1/2005 | Gens | |
| 2004/0159766 A1 | 8/2004 | Skorka | |
| 2005/0079027 A1 | 4/2005 | Ernst et al. | |
| 2005/0084360 A1 | 4/2005 | Panasik et al. | |
| 2005/0175429 A1 | 8/2005 | Panasik et al. | |

FOREIGN PATENT DOCUMENTS

| | | |
|---|---|---|
| DE | 295 02 052 U | 3/1995 |
| DE | 295 09 487 U | 3/1995 |
| DE | 093 01 098 | 1/1997 |
| DE | 93 01 098 | 1/1997 |
| DE | 19 852 339 | 5/2000 |
| EP | 0 951 869 | 10/1999 |
| EP | 965767 A1 | 12/1999 |
| EP | 1 298 331 A | 2/2003 |
| EP | 12522744 A1 | 4/2005 |
| FR | 96 2477 | 9/1996 |
| GB | 2 357 130 A | 6/2001 |
| JP | 2005121224 A | 5/2005 |
| WO | WO-99/05420 | 2/1999 |
| WO | 2004/053341 | 6/2004 |
| WO | 2004/079209 | 9/2004 |
| WO | 2004/079210 | 9/2004 |
| WO | WO/2005/038275 | 4/2005 |

OTHER PUBLICATIONS

SPIT Mini DRIVA product sheets Nov. 23, 2004 (w pages.
Existing Garage Hook Solution Summary, Current Solutions, revised Apr. 26, 2004, 5 pages.

* cited by examiner

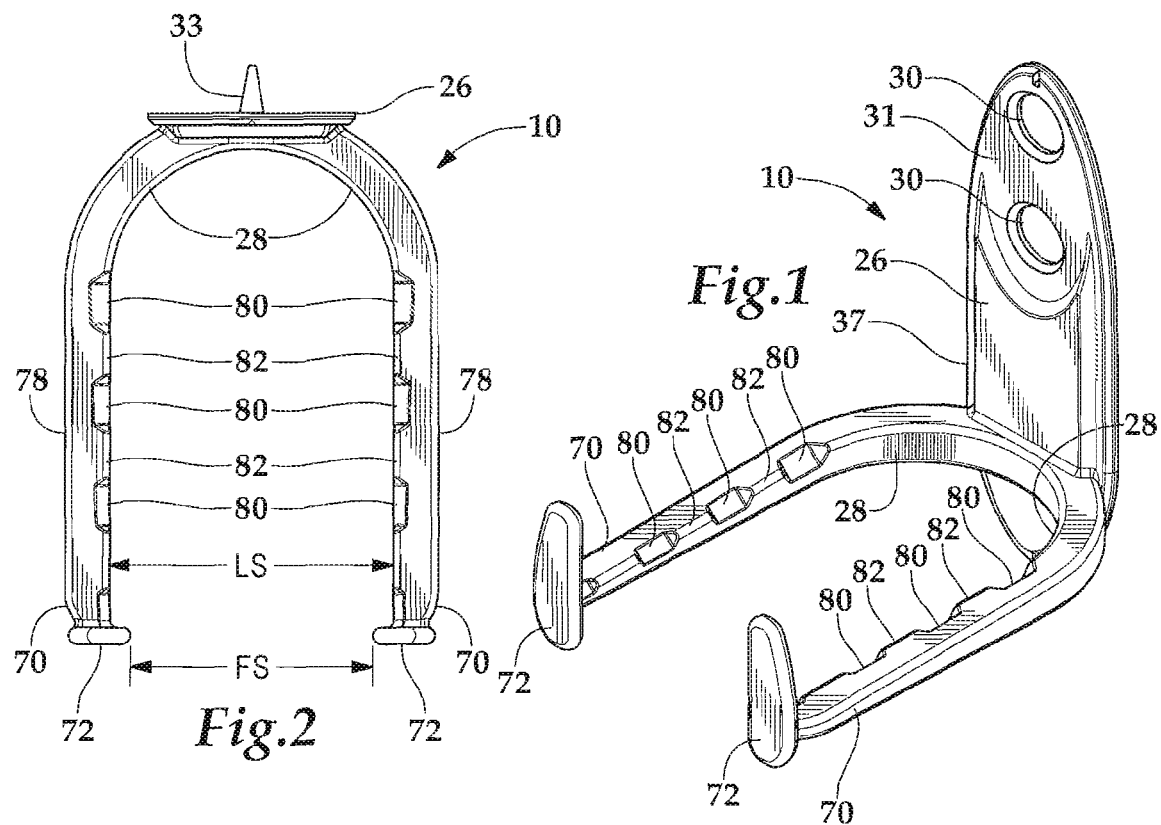
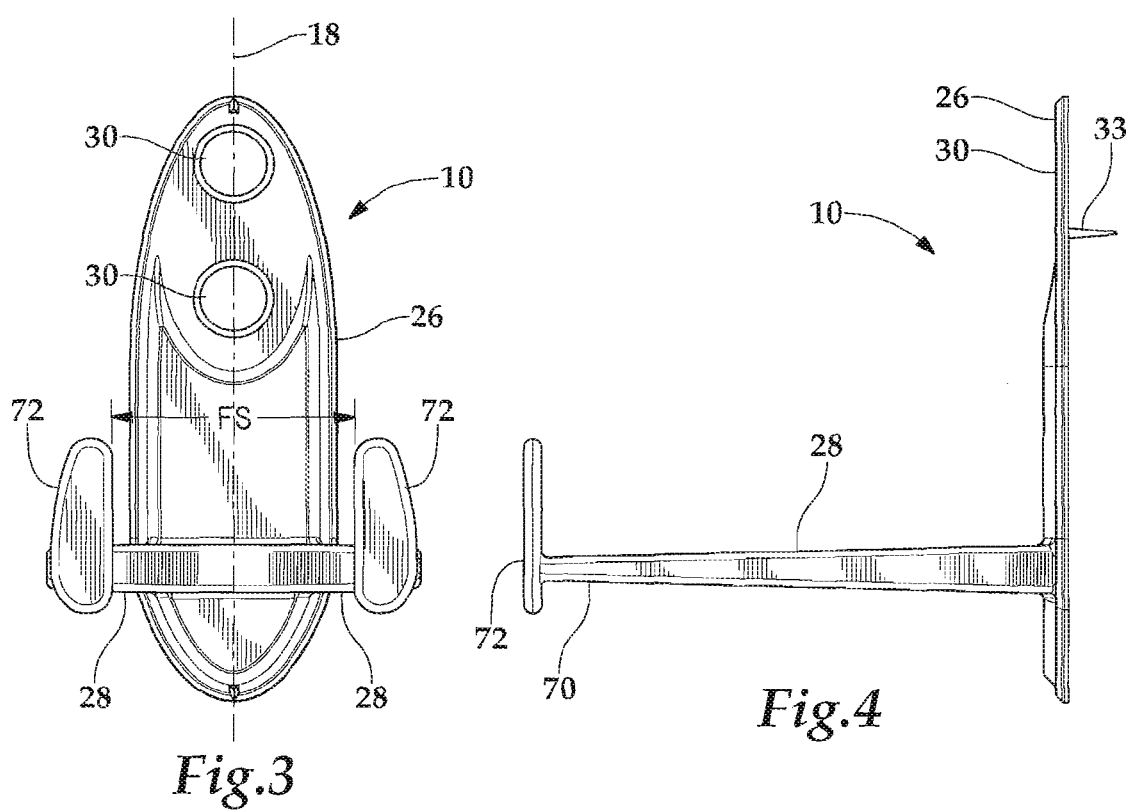

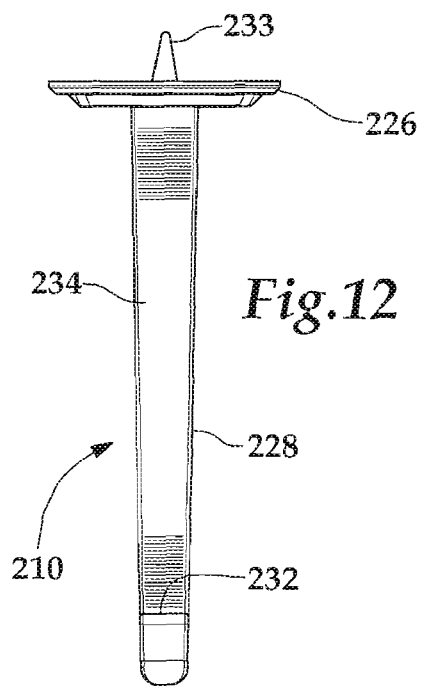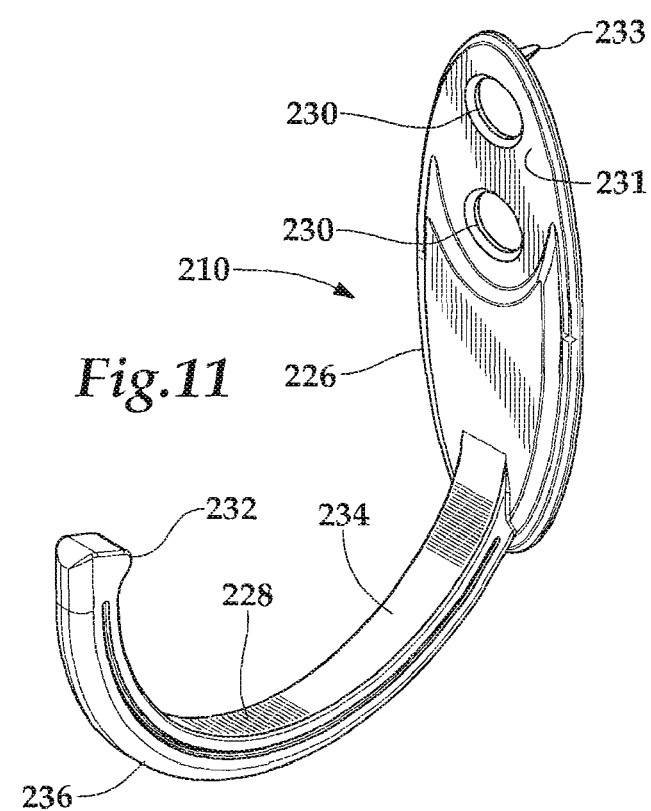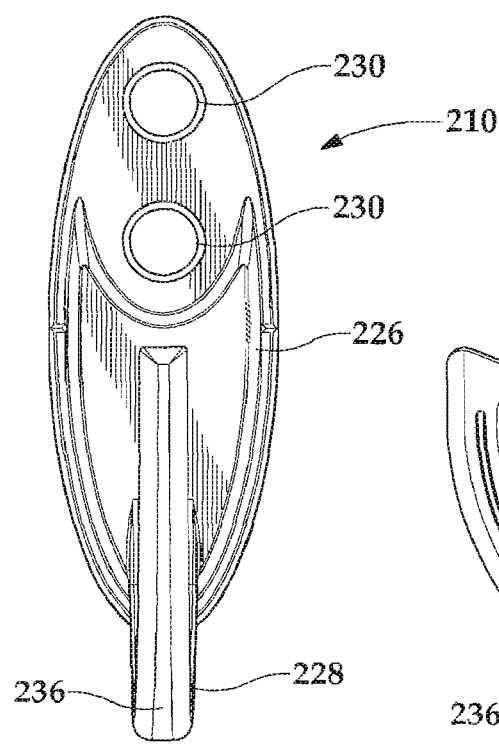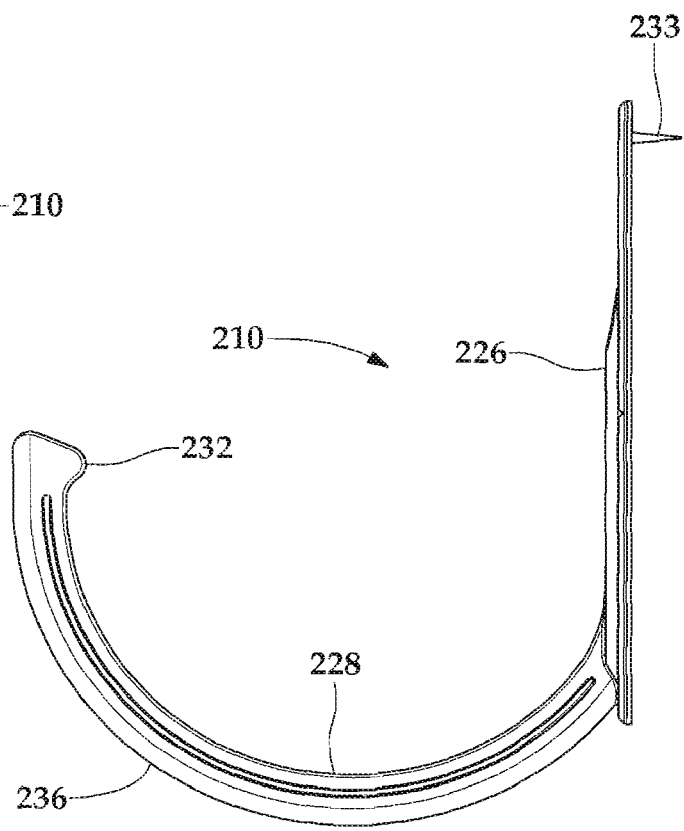

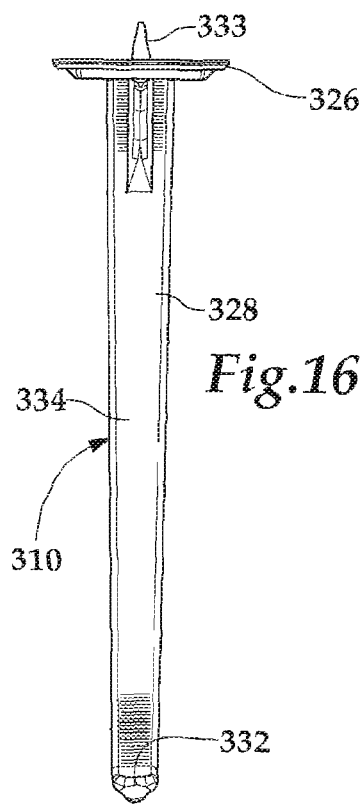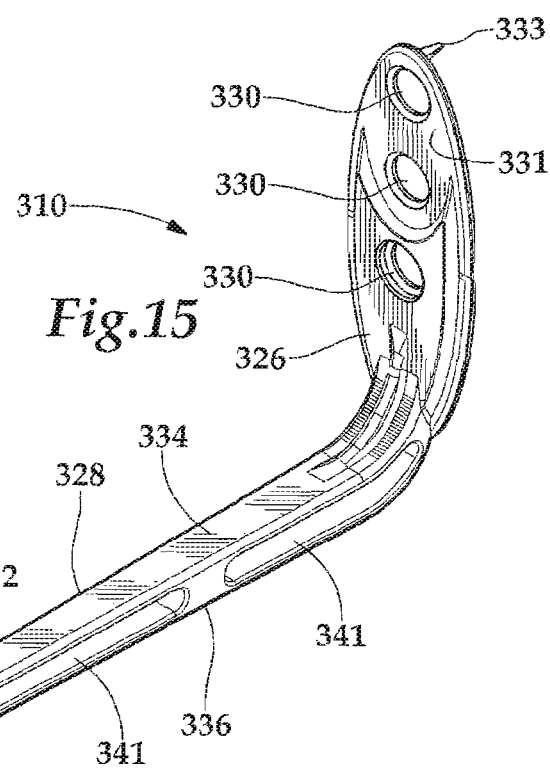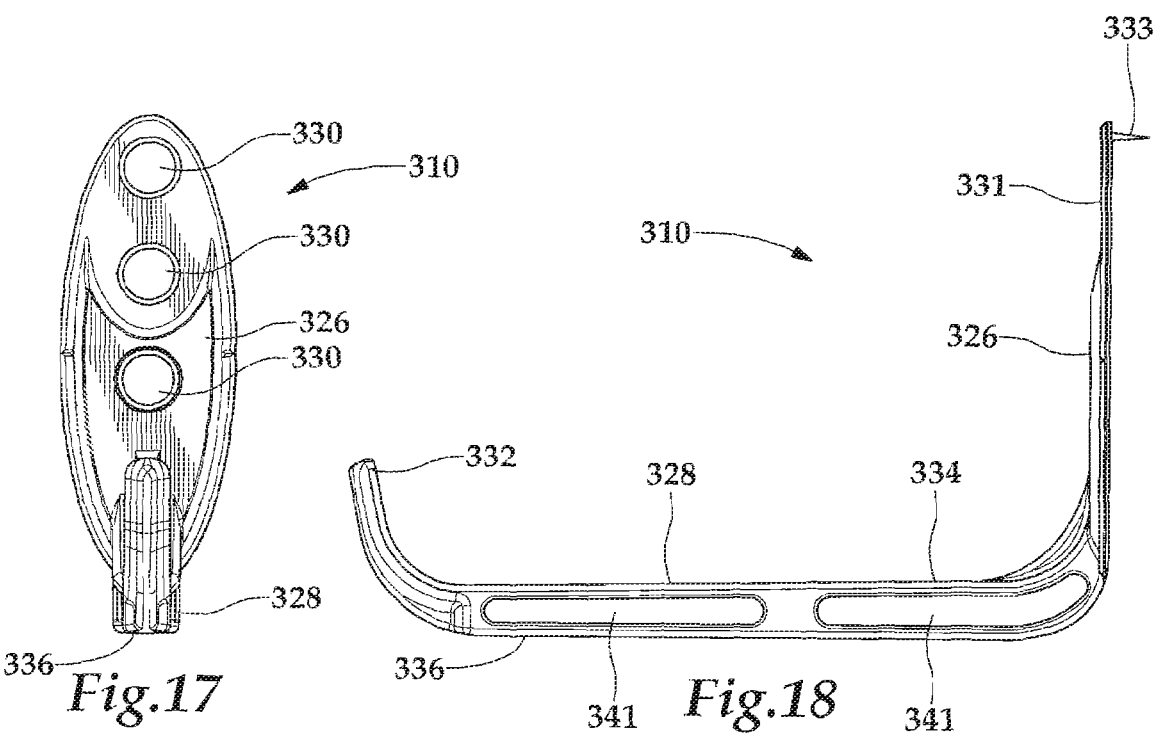

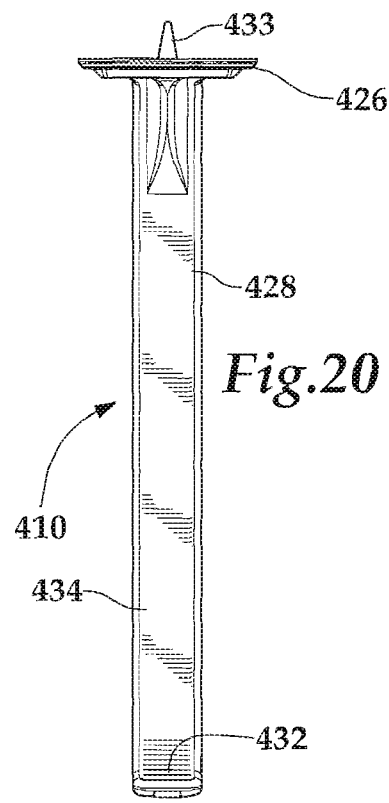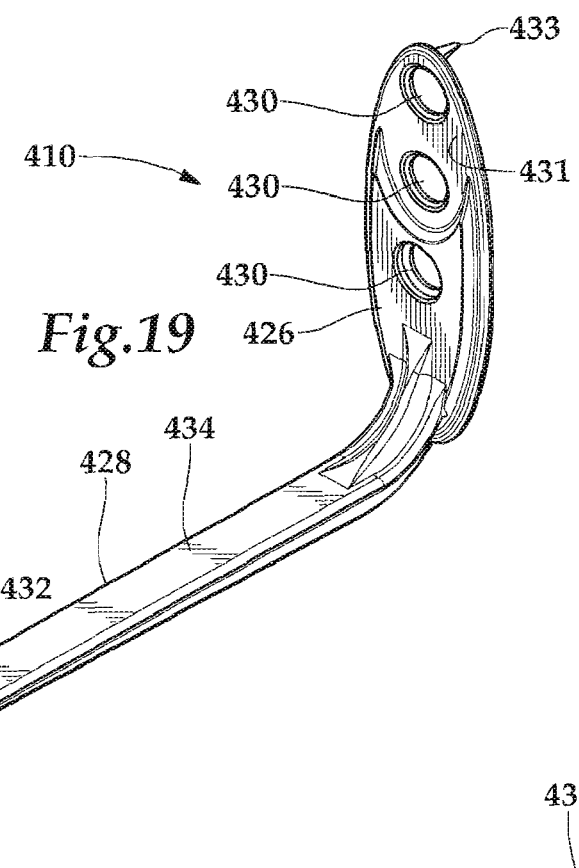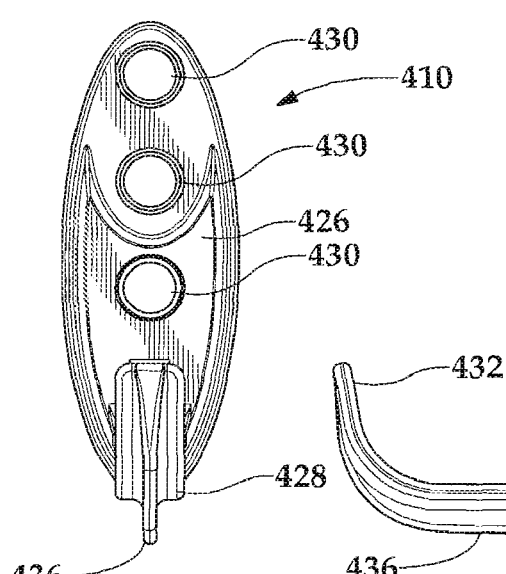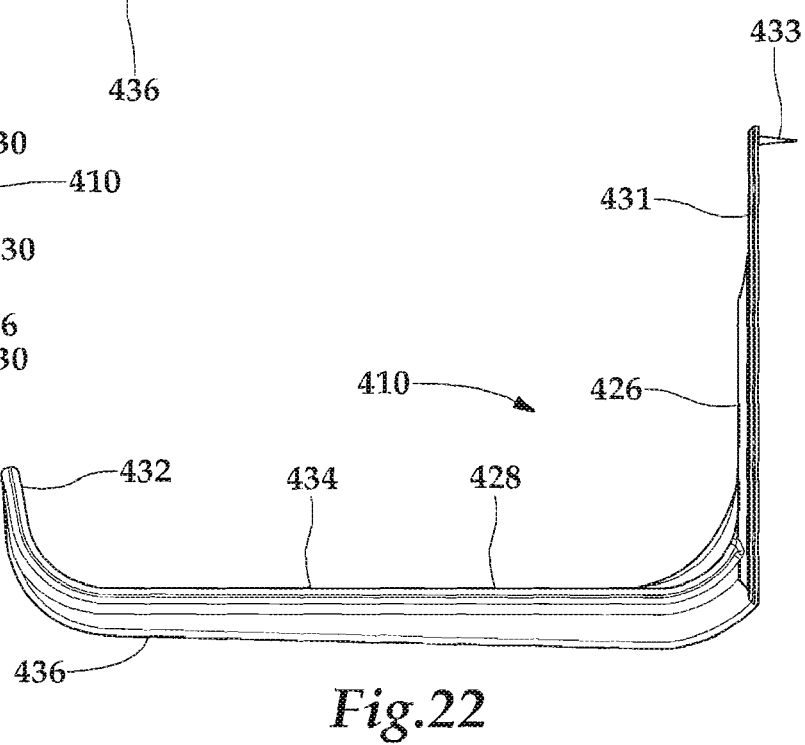

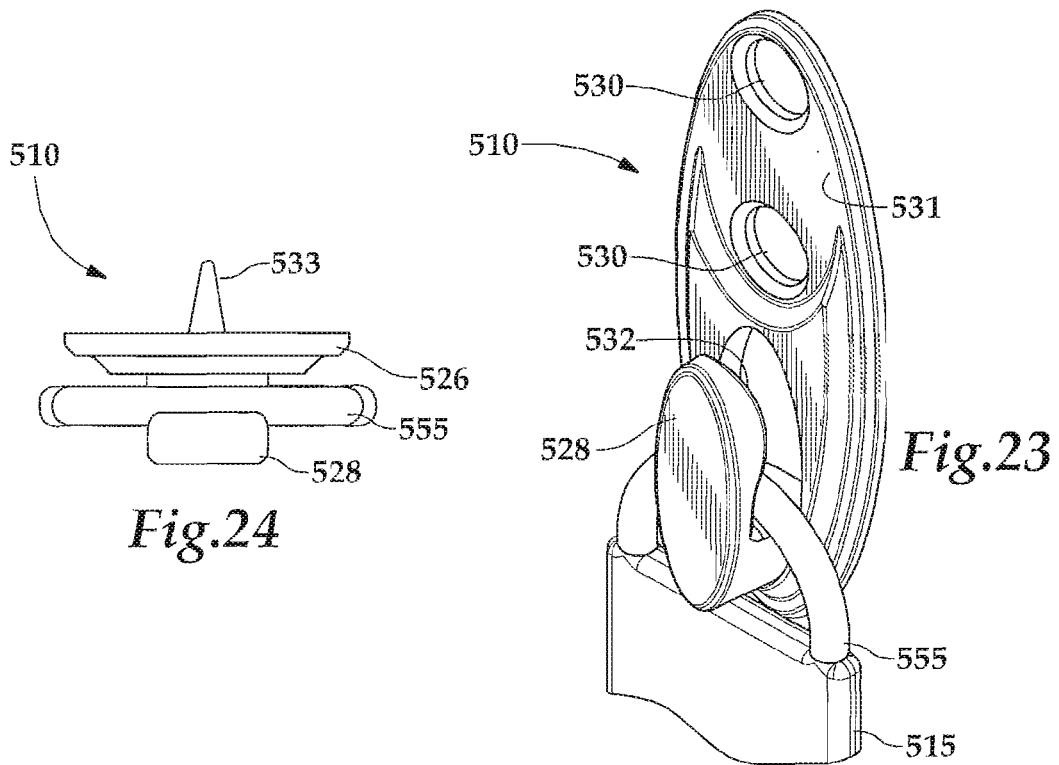
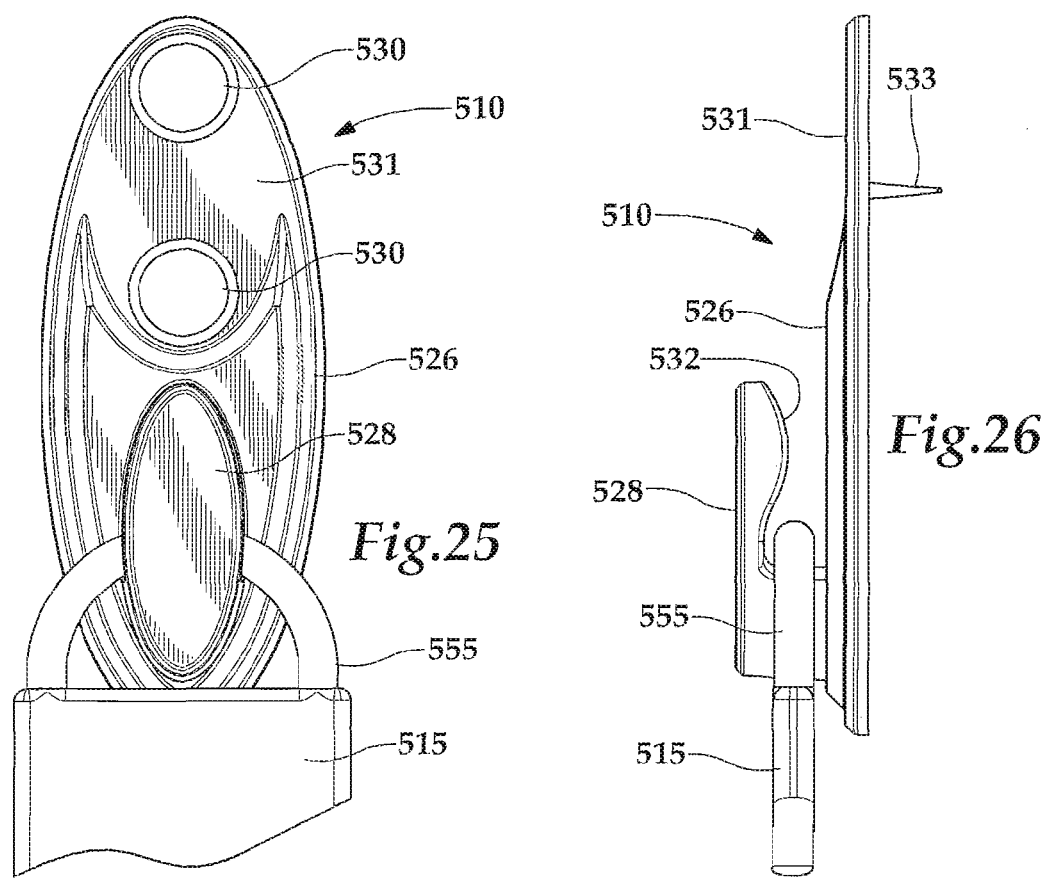

THREE PIECE GARAGE HOOK

This application is a continuation-in-part of U.S. patent application Ser. No. 10/939,795, filed on Sep. 13, 2004 now U.S. Pat. No. 7,160,074, and of U.S. patent application Ser. No. 10/844,706, filed on May 12, 2004, which claims priority to U.S. Provisional Application No. 60/510,708, filed on Oct. 10, 2003.

BACKGROUND OF THE INVENTION

1. Field of the Invention

The present invention is directed to a holder, commonly a garage hook, mountable in a friable substrate such as drywall, for holding an object such as a household or garden item, e.g., a tool such as a spade.

2. Description of the Related Art

Garage hooks typically are wire-like with a drywall penetrating end that is straight, pointed, and typically threaded like a screw for driving into drywall and sometimes a stud. An opposite end usually forms one of a variety of configurations of hooks. Driving the garage hook commonly is accomplished by gripping and turning the hook end to drive the point and the threads into the drywall.

Anyone who has attempted to install wire-like garage hooks knows that it is easier said than done. A firm, steady, axial, pushing-while-rotating force is needed, and driving typically is stuttered and wobbly. If the user hits a stud squarely, great effort and skill are required to force the point and the threads into the stud, which may cause the threads to strip out the soft, friable drywall, often resulting in an unsightly and uncertain installation. More commonly, the user does not hit a stud, and the installation may look sound but is actually wobbly and loose. Moreover, screw-like threads have little pullout strength in drywall alone and can easily strip out the drywall during installation. In use, the garage hook may turn, particularly after repeated loading, unloading and bumps, causing the garage hook to loosen, fall or dump its load from the wall, resulting in damage to the load, the wall, or other garaged property, such as a car.

For additional pullout strength, some garage hooks, see, e.g., U.S. Pat. No. 6,676,350 to McSherry, rely on large drywall-anchor-like threads. Such garage hooks sometimes require pre-drilling and are often defeated if they hit a stud. Although garage hooks with drywall threads provide higher pullout strength in drywall than screw-like threads, they still usually can only hold objects of light to moderate weight.

Pre-drilling into studs or wood may be considered for many kinds of garage hooks, however, in each case, additional planning, tools and time are required. For example, some garage hooks require one or more screws to be driven, but unless pilot holes are positioned, sized and pre-drilled with great care, efforts to drive screws can result in stripping of the drywall.

Illinois Tool Works Inc., assignee of this application, has made many advances in drywall anchors. An anchor sold under the trademark E-Z ANCOR, see commonly assigned U.S. Pat. No. 4,601,625, is a self-drilling drywall anchor. Another anchor, sold under the trademark STUD SOLVER, see commonly assigned U.S. patent application Ser. No. 60/510,708, is a self-drilling drywall anchor capable of penetrating studs. Until now, however, the improvements in drywall anchor technology have not been reflected in garage hooks.

What is needed is a holder mountable to a friable substrate that may be easily installed for increased pullout resistance and load capacity.

BRIEF SUMMARY OF THE INVENTION

In one aspect of the invention, a holder includes at least one self-drilling drywall fastener, a wall-contacting base plate having at least one opening for receiving one said self-drilling drywall fastener, and at least one leg for holding an object. The combination of the self-drilling drywall fastener and the base plate may provide increased pullout resistance and load capacity in a friable substrate. The opening may be sized for engaging a head of the drywall fastener to seat the drywall fastener.

In another aspect of the invention, a holder includes at least one self-drilling drywall fastener having a drilling portion longer than a drywall thickness followed by a high-threaded portion for engaging the friable substrate, a wall contacting base plate having at least one opening for receiving one said self-drilling drywall fastener, and and at least one leg for holding an object. In this configuration, the drilling portion may bore a pilot hole entirely through the drywall before the high threads begin to engage the drywall. The high-threaded portion also may be longer than the drywall thickness, so that the high threads may engage the rear drywall surface and add further to the pullout resistance and load capacity.

In still another aspect of the invention, a holder includes at least one self-drilling drywall fastener having a screw-like distal portion longer than a drywall thickness followed by a high-threaded drywall-engaging portion and a head having a recess for receiving a rotary driver, a wall contacting base plate having a pair of openings each capable of receiving one said self-drilling drywall fastener, and at least one leg for holding an object. In this configuration, if a stud is encountered, the screw-like drilling portion may self-drill into the stud. The at least one leg and pair of base plate openings may be aligned for increased pullout resistance and load capacity.

These and other features and advantages are evident from the following description of the present invention, with reference to the accompanying drawings.

BRIEF DESCRIPTION OF THE SEVERAL VIEWS OF THE DRAWINGS

FIG. 1 is a perspective view of a holder mountable to a friable substrate for holding an object.

FIG. 2 is a top plan view of the holder of FIG. 1.

FIG. 3 is an elevation view of the holder.

FIG. 4 is a side view of the holder.

FIG. 11 is a perspective view of another embodiment of a holder mountable to a friable substrate for holding an object.

FIG. 12 is a top plan view of the holder of FIG. 11.

FIG. 13 is an elevation view of the holder.

FIG. 14 is a side view of the holder.

FIG. 15 is a perspective view of another embodiment of a holder mountable to a friable substrate for holding an object.

FIG. 16 is a top plan view of the holder of FIG. 15.

FIG. 17 is an elevation view of the holder.

FIG. 18 is a side view of the holder.

FIG. 19 is a perspective view of another embodiment of a holder mountable to a friable substrate for holding an object.

FIG. 20 is a top plan view of the holder of FIG. 19.

FIG. 21 is an elevation view of the holder.

FIG. 22 is a side view of the holder.

FIG. 23 is a perspective view of another embodiment of a holder mountable to a friable substrate for holding an object.

FIG. 24 is a top plan view of the holder of FIG. 23.

FIG. 25 is an elevation view of the holder.

FIG. 26 is a side view of the holder.

Figure 5:
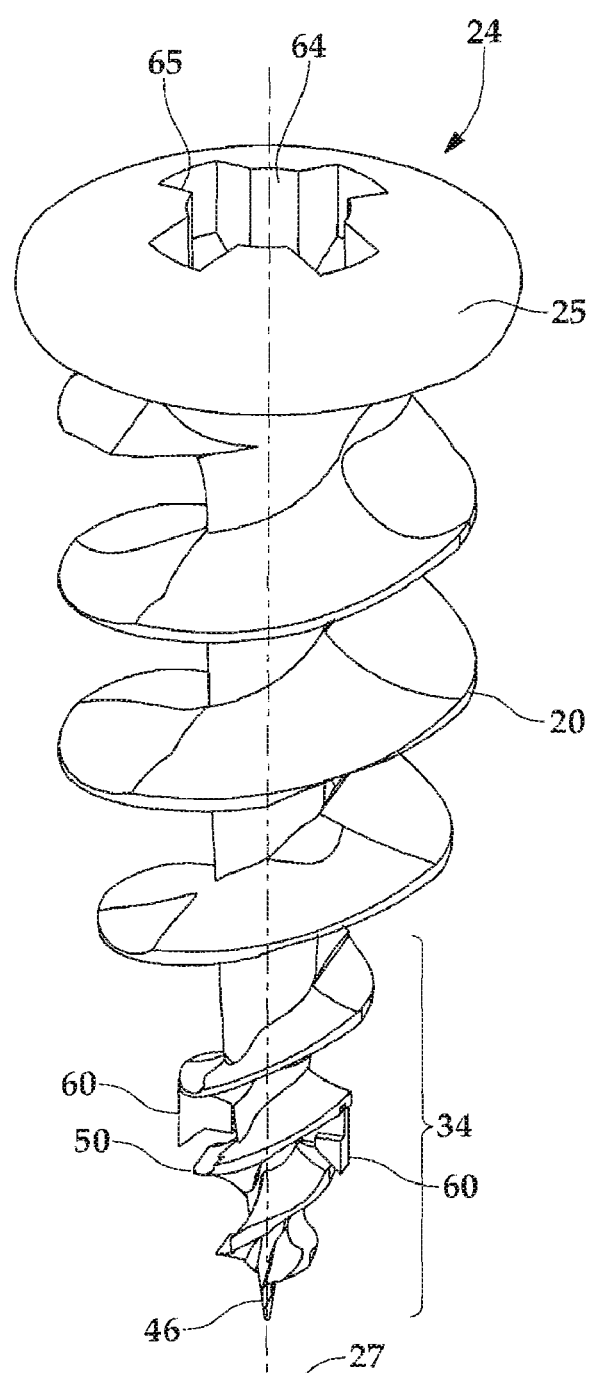
FIG. 5 is a perspective view of a drywall type fastener.
Figure 6:
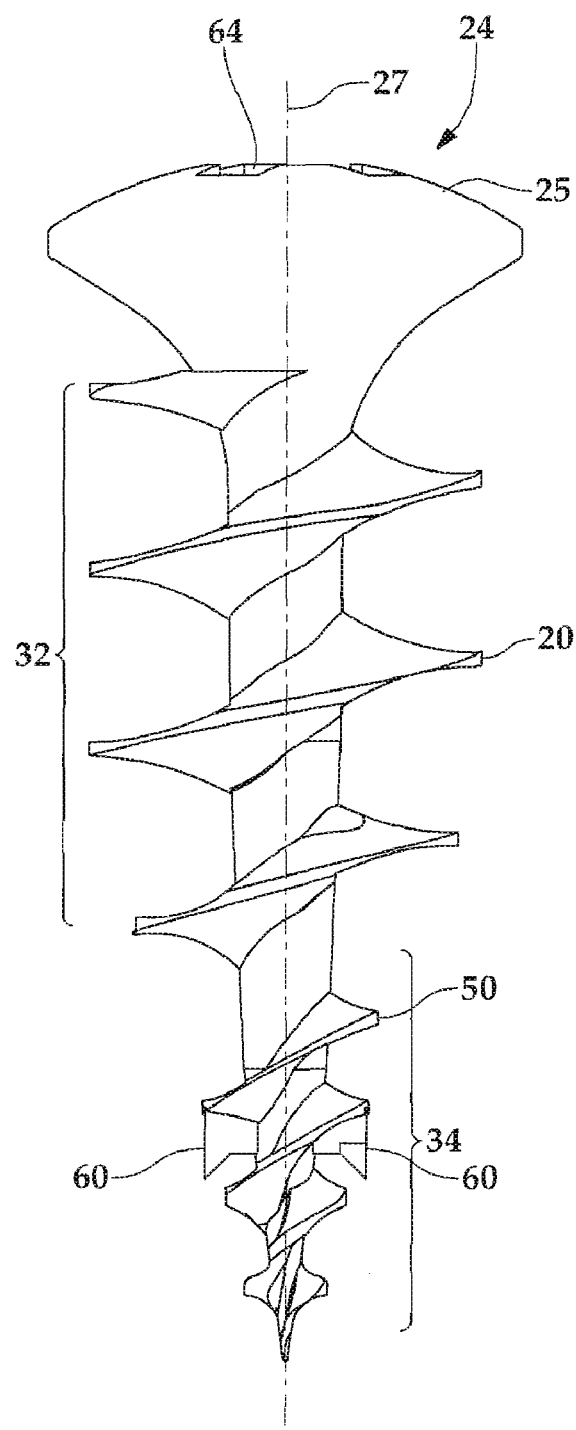
FIG. 6 is elevation view of the drywall type fastener of FIG. 5.
Figure 8:
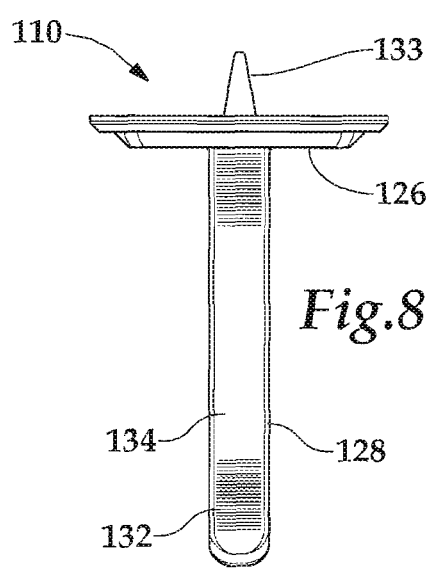
FIG. 8 is a top plan view of the holder of FIG. 7.
Figure 7:
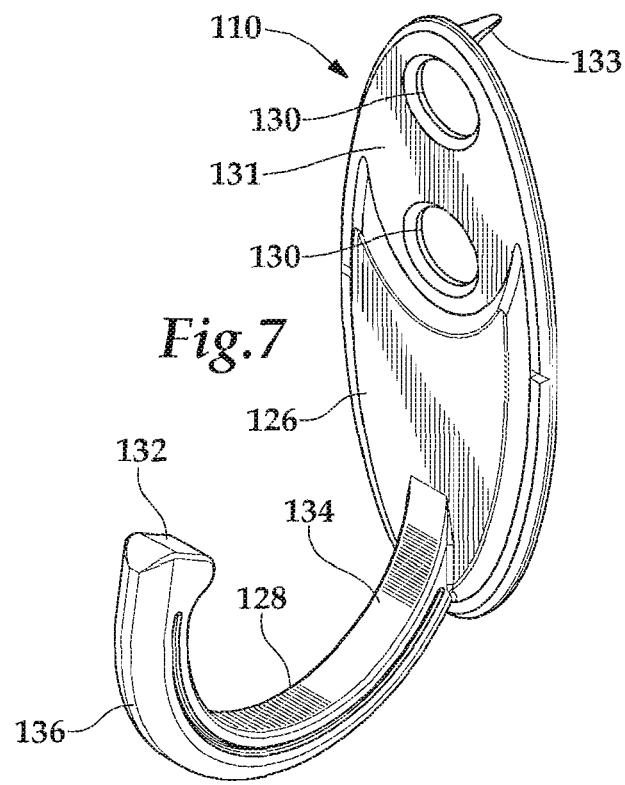
FIG. 7 is a perspective view of another embodiment of a holder mountable to a friable substrate for holding an object.
Figure 9:
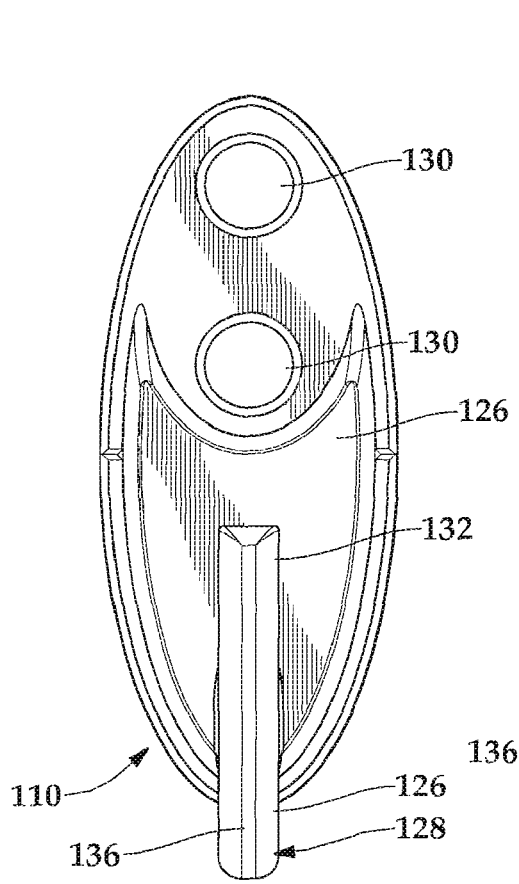
FIG. 9 is an elevation view of the holder.
Figure 10:
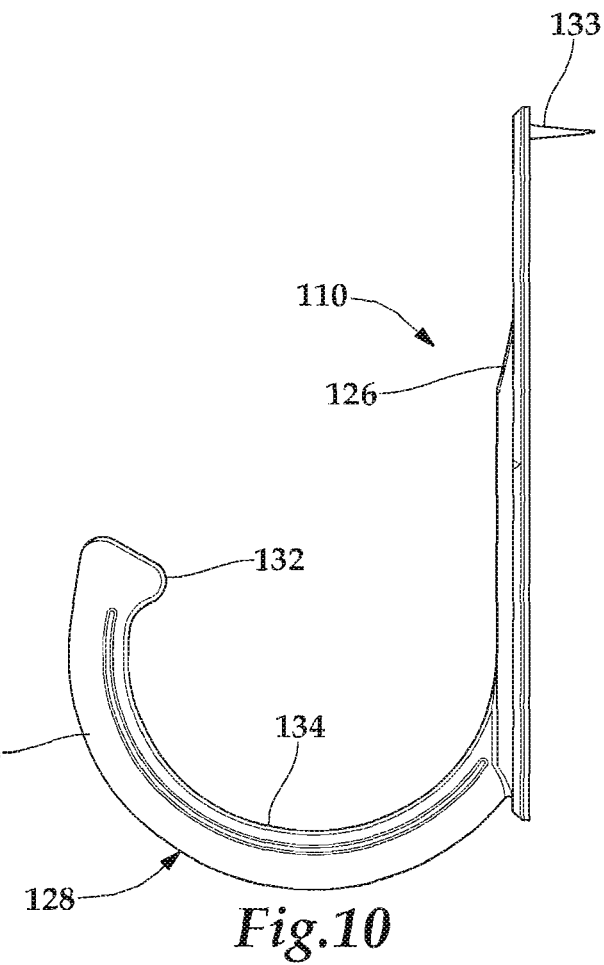
FIG. 10 is a side view of the holder.
Figure 27:
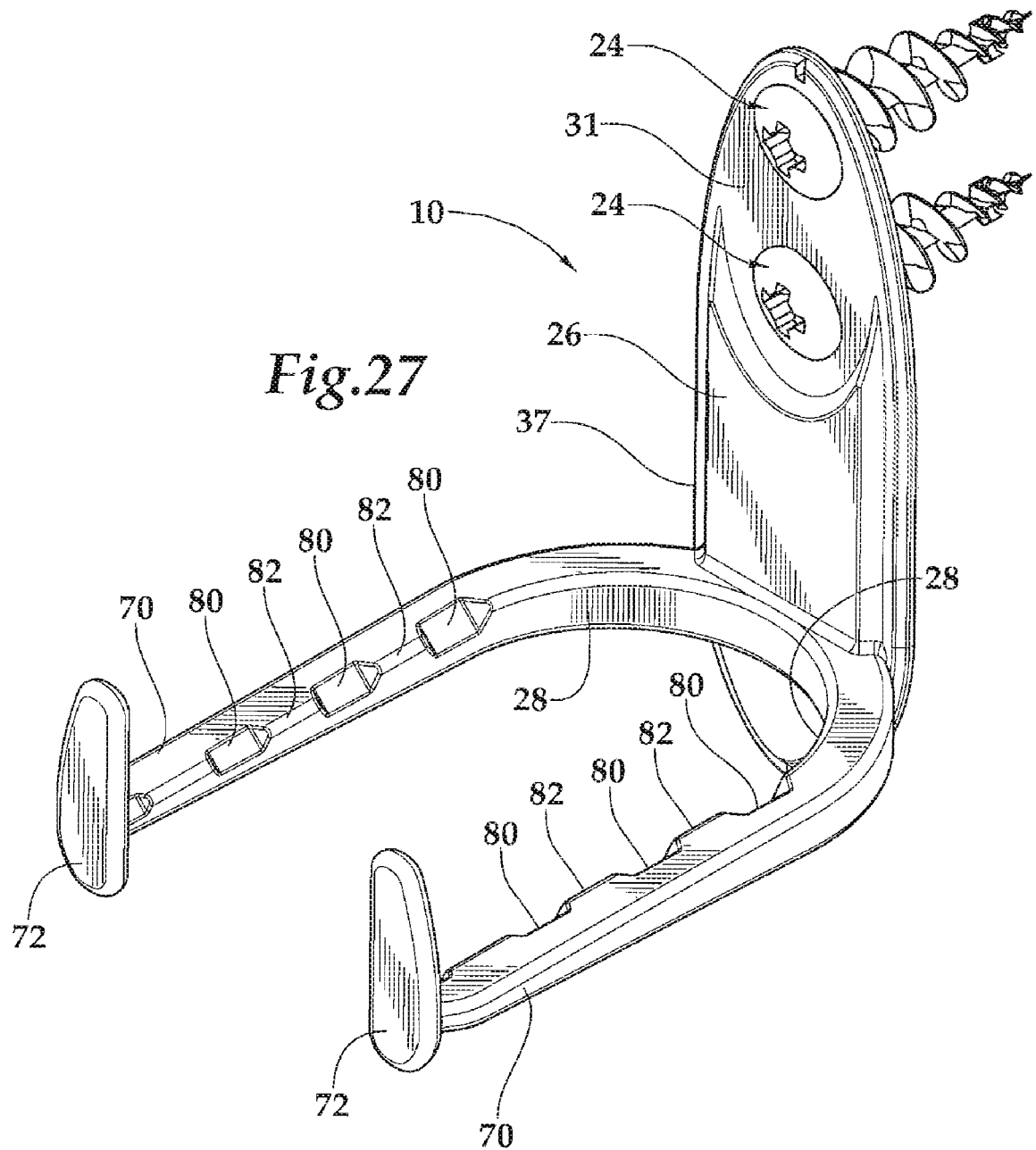

FIG, 27 is a perspective view of the holder of FIGS. 1-4 in combination with the fastener of FIGS. 5-6.

DETAILED DESCRIPTION

Referring to FIGS. 1-4, a holder 10 includes a flat, generally oval or "surfboard-shaped" flange or base plate 26 having at least one and, as shown, a pair of openings 30 to one side (e.g., above) of its center, each capable of receiving an drywall fastener 24 (see FIGS. 5 and 6). At least one and potentially two or more legs 28 extend from base plate 26 to the other side of center (e.g., below) for holding an object. Leg(s) 28 and drywall fasteners 24 spaced to either side of the center of the flange or base plate provide for higher overall pullout resistance and load capacity for holder 10.

Holder 10 is mountable to a friable substrate such as drywall and is used for holding, typically hanging, an object (not shown), such as a tool, a ladder, a broom, a spade, a bicycle, or other objects on a friable substrate such as drywall. Holder 10 allows a user to select a position anywhere on drywall that is feasible to place the object desired to be held. Holder 10 may be used for holding tools or other objects on interior or exterior friable substrates of a residential home and is particularly useful for hanging tools or other objects from a wall or ceiling within a garage; therefore, holder 10 will be described and shown as a garage hook. However, holder 10 may be equally usable in other applications.

The friable substrate may be one of several materials used in construction, such as stucco, plaster, or gypsum based drywall sold under the trademark SHEETROCK by United States Gypsum. Drywall typically has a thickness T of about ½ inch or about ⅝ inch, but it may be obtained in other thicknesses, such as about ⅜ inch. Typically, friable substrates such as drywall are mounted to support studs, such as wood support studs, for example 2×4 studs or the like, evenly spaced apart, e.g. every 16 inches, or metal support studs, such as steel support studs. Studs are substantially more resistant to pullout than drywall because they are less friable and much less likely to break apart.

Holder 10 and drywall fasteners 24 may be made from a sturdy material such as plastic, nylon, steel or aluminum, and in a one embodiment, cast zinc.

Fasteners 24 anchor and also rotationally lock holder 10 in place to prevent rotation and loosening of holder 10. The openings 30 may be positioned generally vertically above center, as shown in FIG. 1, so that the pullout strength acts to prevent holder 10 from pivoting outwardly away from drywall. Installing holder 10 with drywall fastener(s) 24 positioned above center with drywall fastener threads 32 engaged in drywall increases the shear load holder 10 can withstand. Two openings 30 are included in base plate 26, as shown in FIG. 1. The base plate also may have a rearwardly projecting tang 33, which may puncture the paper surface of the drywall and extend a short distance into the drywall to pre-position the holder on the drywall surface for fastener insertion, and, upon installation, to further enhance the shear load capacity of the installed holder.

Referring to FIGS. 5 and 6, each drywall fastener 24 includes a head 25 having a recess 64, such as the Phillips recess 64 shown in FIG. 5, for receiving a rotary driver (not shown) so that holder 10 may be installed with a driving tool, such as a screwdriver or a drill with a screwdriver bit. Recess 64 includes one or more torque transmitting surfaces 65 so that torque may be transmitted from the rotary driver to rotate drywall fastener 24 in order to drive drywall fastener 24 through the drywall.

One or more legs 28 extend from base plate 26, providing a place to hang an object. Legs 28 may come in many configurations, including straight legs, J-shaped legs, C-shaped legs, bicycle hooks, ladder hooks, tool hooks, coat or hat hooks, or a U-shaped pair of legs 28. Each leg 28 may extend axially out from base plate 26, as shown in FIGS. 3 and 4, or may extend laterally along an outer surface of the drywall.

Continuing with FIGS. 1-4, in one embodiment, a pair of legs 28 forms a U-shape. A U-shaped holder 10 may be particularly useful for holding long handled objects, such as a spade or broom, so that the handle fits between legs 28 and the spade blade or the broom head rests on legs 28. Legs 28 are diametrically opposed, symmetrical about an axis 18, and generally aligned in a common plane so that legs 28 may be positioned so they are level and parallel with the floor. Each leg 28 may also include a distal portion 70 that may be generally parallel each other and generally perpendicular to base plate 26. Each leg 28 has an enlarged foot 72 at distal portion 70, at a distal end of leg 28 to prevent the object from sliding off or tipping over the end of legs 28 and for improved safety.

It may be desirable that the spacing LS between legs 28 be large enough so that a typical handle of a broom or spade, i.e. a cylindrical handle having a diameter of between about 1 inch and about 1½ inches, will fit between legs 28. An inner edge of each foot 72 may protrude inwardly toward the other leg 28 so that the spacing FS between feet 72 may be smaller than spacing LS between legs 28, as best viewed in FIG. 2. The foot may also extend upwardly from leg 28, as best viewed in FIG. 4 to provide a stop to prevent a tool, such as a spade, from sliding between feet 72. In one embodiment, as best viewed in FIG. 3, each foot 72 has rounded edges 76 facing outwardly for improved safety. In this regard, the legs 28 and feet 72 may also be coated with a durable plastic material.

The spacing FS and LS between feet 72 and legs 28 may be large enough, and base plate 26 is long enough so that the nose of a drill will fit between feet 72 and legs 28 so that a user may use a typical cordless drill adapted with a screwdriver bit to engage recess 64 and rotate each drywall fastener 24 to drive each drywall fastener 24 through a hole 30 into the drywall.

In one embodiment, the spacing LS between the pair of legs 28 may be between about 1½ inches and about 3 inches, e.g., about 2 inches. In one embodiment, each foot 72 protrudes inwardly from its corresponding leg 28 between about 1/16 inch and about ¼ inch, e.g., about ⅛ inch, so that for a pair of legs 28 with spacing LS of about 2 inches, the spacing FS between feet 72 may be between about 1½ inches and about 1¹⁵/16 inches, e.g., about 1¾ inches. Each foot may extend upwardly from corresponding leg 28 by between about ¼ inch and about ¾ inch, e.g., about ½ inch. In one embodiment, the feet 72 extend upwardly and downwardly from legs 28, as shown in FIG. 4.

Continuing with FIGS. 1-4, each side of distal portion 70 of each leg 28 may include upper and lower flat surfaces 78 which may be generally parallel to the common plane of legs 28 so that when legs 28 are level, an object laid across flat surfaces 78 will also be level. Legs 28 may also include one or more grooves 80 formed in each leg 28 so that an object may rest within the grooves 80. For example, an object having a thin portion that will be laying on legs 28, i.e. the blade of a shovel or spade, may be hung off legs 28 so that the thin portion rests in grooves 80 to prevent the spade from rolling or sliding along legs 28. In one embodiment, best seen in FIGS. 1-4, each leg includes three grooves 80 spaced apart by stops 82 between base plate 26 and foot 72.

Legs 28 and feet 72 may be symmetrical, as best shown in FIGS. 1 and 3. In addition, in FIGS. 1 and 3, when legs 28 are positioned so that they are level, openings 30 may be positioned so that they are generally centered vertically above legs 28, on axis 18.

Referring to FIGS. 5 and 6, in one embodiment, self-drilling drywall fastener 24 has an enlarged head 25, an axis 27, a drilling portion 34 having a length longer than a thickness of the friable substrate or drywall and a high-threaded proximal portion 32 for engaging friable substrate or drywall. The threads 32 are sized to pass freely through the openings 30 in the base plate 26, while the head 25 engages the base plate 26 around the openings 30. The base plate 26 is substantially wider than a largest outside diameter of proximal portion 32.

Drywall fastener 24 may have a long unthreaded drilling portion 34 of the type sold under the trademark STUD SOLVER, see commonly assigned U.S. patent application Ser. No. 60/510,708, is a self-drilling drywall anchor capable of penetrating studs, but preferably has the configuration shown in FIGS. 5 and 6. Because drywall fastener 24 is not an anchor and does not receive a fastener, drywall fastener 24 may be solid rather than hollow, allowing drywall fastener 24 to have a smaller root diameter while still providing the durability necessary to be driven into drywall and any stud which may be behind the drywall.

FIGS. 7 through 10 show a similar holder 10, which, instead of a pair of legs 28 is provided with a J hook 128. The base plate 126 of the holder 10 is a similar flat, oval or surfboard-shaped element, but of a somewhat shorter length than the base plate 26. The base plate 126 has a pair of through openings 130 for receiving drywall fasteners 24, substantially identical to the openings 30 described above.

The J hook holder 110 includes a single, and generally J shaped leg 128, which in the illustrated embodiment has an enlarged head portion 132, which extends back inwardly in the direction of the base plate 126. In cross-section, the hook or leg 128, as shown has a generally flat upper portion 134 and curves to a relatively thin flat 136 on its underside. The inner surface of the head 132 may be rounded. In the same fashion as the U-hook type holder 10 described above, the leg or hook portion 128 of the J hook type holder 110 may be coated with a durable plastic material.

Referring to FIGS. 11 through 14, a second, a second embodiment of a J-hook type holder is shown, and designated generally by reference numeral 210. The J hook 210 is generally configured similarly to the J hook type holder 110 described above, whereby like reference numerals with the prefix 2 are utilized to designate the like parts and components. The leg or hook portion 228 of the J hook type holder 210 is, however, longer than the hook 128.

Referring also to FIGS. 1 through 4, it will be seen that in each case the base plate 26, 126, 226 has a recessed area 31, 131, 231 in which the holes 30, 130, 230 are formed. The remainder of each base plate 26, 126, 226 is somewhat thicker to support the leg or hook portion. Also, it will be seen that the base plate 26 is somewhat longer than base plates 126, 226, having short relatively straight or flat sections 37 at an intermediate portion thereof, whereas base plates 126 and 226 are substantially continuously curved peripherally. Also, the tang 33 of the type holder 10 is positioned between the holes 30, whereas the tangs 133 and 233 of the holders 110 and 210 are positioned above the top hole 130, 230.

FIGS. 15 through 18 and FIGS. 19 through 22 show two embodiments of a holder having an elongated, generally L-shaped leg or hook 328, 428 which will be referred to herein as a ladder hook. These holders may be used for hanging any of a number of relatively large objects. Also, in order to accommodate somewhat larger or heavier objects, the base plates 326, 426 of the ladder hooks 310, 410 may optionally include three mounting holes 330, 430 rather than the two holes shown on the previous embodiments. In this regard, the base plates 326, 426 are substantially similar to the base plates 126, 226 described above. However, each of the previous embodiments may also employ three holes, if desired. In this regard, each of the embodiments shown may employ more or fewer holes without departing from the invention. Moreover, while the mounting holes are shown aligned along the same axis in the illustrated embodiments, it will be understood that one or more mounting holes may be formed off axis, if desired, and that the base plates may be widened, if necessary, to accommodate such off-axis holes. In the same fashion as the U-hook type holder 10 described above, the leg or hook portions 328, 428 of the ladder hook type holders may be coated with a durable plastic material.

The ladder hook type holder 310 has an elongated leg or hook portion 328, which has a generally flat top surface 334 and a similar flat bottom surface 336 separated by one or more through openings 341. These openings 341 are utilized primarily to reduce the amount of material required in a molding process to produce the holder 310, while maintaining strength (i.e., inertia being proportional to the cube of thickness). In the alternative embodiment shown in FIGS. 19 through 22, the elongated leg or hook 428 is configured with a generally T-shaped cross-section. In this regard, the ladder hook 428 includes a generally flat top surface 434 and a generally centered rib 436 projecting from a bottom surface. Similar outer end portions of the ladder hooks 310, 410, designated by reference numerals 432, 332 are directed up at approximately a right angle to the elongated leg portion 328, 428.

In FIGS. 23 through 26, the holder 510 has yet another form of hook, shaped for receiving a complementary-shaped hanger part of a tool or other object, or more particularly an O-ring or D-ring or other wire form 555 (comprising a part of the holder 510) which may be affixed to or otherwise configured to hang or otherwise support an object to be suspended from or held by the holder, or, as shown in FIG. 23, may be affixed to one or both ends of a strap 515 for holding an object. Holder 510 has a base plate 526 similar to base plate 126 in shape but somewhat smaller. The base plate 526 is provided with openings 530 substantially identical to the openings 30 described above. Holder 510 has a short hook 528 with an enlarged, rounded head portion 532, which extends back inwardly in the direction of the base plate 526 this configuration may define a snap like engagement with the O-ring or D-ring or other wire form 555.

Drywall Fastener

In one embodiment, shown in FIGS. 5 and 6, self-drilling drywall fastener 24 has an axis 27, a screw-like drilling portion 34 longer than the thickness of drywall, a high-threaded drywall engaging proximal portion 32 and a head 25 having a tool receiving recess 64 for receiving a rotary driver.

Continuing with FIGS. 5 and 6, in one embodiment, self-drilling drywall fastener 24 includes a high-threaded proximal portion 32 having threading 20 with a crest diameter and a high thread height for engaging drywall, and threaded drilling portion 34 longer than a thickness of drywall and threading 50 with a crest diameter substantially smaller than the crest diameter of proximal portion 32 and a thread height substantially smaller than the thread height of proximal portion 32.

The crest diameter of threading 20 of proximal portion 32 may be about twice the root diameter of threading 50. In one embodiment, the crest diameter of threading 20 may be between about ¼ inch and about ¾ inch, for example about ½ inch, the root diameter at proximal portion 32 may be between about ⅛ inch and about ⅜ inch, and the thread height of threading 50 may be between about ⅛ inch and about ⅝ inch, for example about ¼ inch. The high-threaded proximal portion 32 may be slightly longer than drywall thickness so that high threading 20 is able to engage the paper on an inner drywall surface to add further to the pullout resistance and load capacity of holder 10 as well as to accommodate the seating of the head 25 on the back plate 26 around the hole 30.

In one embodiment, drywall gripping threading 20 may be one continuous generally helical thread and the root of proximal portion 32 expands tapers from drilling portion 34 toward proximal end so that drywall fastener 24 has enough strength to be driven into wood.

The screw-like drilling portion 34 with a length longer than drywall thickness allows drywall fastener 24 to bore a hole entirely through the drywall before high threading 20 on proximal portion 32 begins to engage the drywall. The screw-like smaller threading 50 of drilling portion 34 also allows drywall fastener 24 to be able to grip and drill into a stud if a user encounters a stud while installing holder 10 because the substantially smaller thread height and crest diameter of drilling portion 34 may be driven into a stud without excessive torque. In one embodiment, the crest diameter of threading 50 of drilling portion 34 is between about 1/16 inch and about ¼ inch, e.g., about ⅛ inch, and the thread height of threading 50 is between about 0.02 inch and about 0.07 inch, e.g., about 0.035 inch Threading 50 may include a generally helical thread, as shown in FIG. 5, which may continue as thread 20 on proximal portion 32 so that there may be a continuous thread between drilling portion 34 and proximal portion 32. In one embodiment, drilling portion 34 may includes two generally helical threads arranged in a double helix to provide added support around drilling portion 34, to provide faster engagement of drywall fastener 24 with a stud, and to provide balanced driving into stud. The second thread of the double helix may be present for only a portion of drilling portion 34 proximate drilling end 24, or it may continue substantially through all of drilling portion 34 to provide improved grip with a stud.

Drywall fastener 24 may include a drill tip 46 at drilling end 24. In one embodiment, shown in FIG. 6, drill tip 46 is generally conical in shape and coaxial with axis 27 so that drill tip 46 comes to point at axis 27 to guide and quickly engage outer drywall surface 44 and the surface of a stud. In one embodiment, drilling portion 34 may include at least one wing 60, and as shown, a pair of wings 60, that protrudes radially outwardly from drilling portion 34 for reaming out drywall to form a hole having the desired size. Wings 60 are designed to break away when they hit a stud so that wings 60 ream out drywall and not a stud.

Method of Use

Each of the holders 10, 110, 210, 310, 410 and 510 may be used by a method including the steps of selecting a location on a wall or ceiling, positioning the holder against the wall or ceiling at the selected position, pressing on said base plate to cause said rearwardly projecting tang to puncture the surface of the drywall and extend a short distance into the drywall, aligning a first drywall fastener 24 with one of the openings, and rotating drywall fastener 24 in a clockwise direction so that drywall fastener 24 drills through the drywall, continuing to rotate drywall fastener 24 until a fastener head engages base plate. The method may also include the step of inserting another fastener 24 into the other opening, and driving the fastener 24 through the drywall until fastener head abuts base plate.

A user may select a position on the wall or ceiling without worrying about the location of a stud located behind drywall because of the configuration of external threading 20 and 50, which allows drywall fastener 24 to drill through drywall and a stud. This feature also allows a user to intentionally position the holder so that drywall fastener 24 does hit stud, because there may be greater hold between drywall fastener 24 and stud, i.e., because the stud or other support member may be less likely to break apart than drywall. The ability to position the holder virtually anywhere along a wall or ceiling allows a user to arrange a plurality of holders on the wall or ceiling for more efficient use of the space allowing a plurality of objects to be held while only needing to install holders using the mounting drywall fasteners 24 with a screwdriver or other rotary driver. The step of rotating drywall fasteners 24 may be accomplished by inserting a rotary driver into recess 64 and driving fasteners 24 with the rotary driver.

The holder of the present invention provides for the use of self-drilling drywall fasteners to increase the overall pullout resistance and load capacity of the holder. In one embodiment, the base plate engages the heads of the fasteners to meter and stop the fasteners so that the fasteners engage the drywall without stripping it out, increasing engagement between the fastener threads and the drywall. The holder also allows a user to hold an object at virtually any position on a surface of a wall or ceiling, even at a location where a support member may be behind the drywall.

Method of Making

A holder of the type described above, and comprising a base plate having at least one opening to receive an anchor, and at least one leg extending from said base plate for holding an object may be made by a method comprising the following steps. Providing a pair of molds having complementary mating cavities, together defining said holder, feeding molten material into said cavity; setting said molten material to form said holder; and removing said holder from said mold. The drywall fastener may be made by a similar molding process.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A holder assembly mountable to a friable substrate comprising:

at least two self-drilling drywall fasteners, each having an axis, a head, exterior threading for engaging said friable substrate, a proximal end, and a drilling end;

a base plate having a center, wherein said base plate has at least two openings located above said center to receive said drywall fasteners, wherein for each of said drywall fasteners said threading of said proximal end has a crest diameter of at least about ¼ inch, and wherein each of said openings admits said threading of a corresponding one of said fasteners, said base plate being wider than a largest outside diameter of said exterior threading, and a leg located below said center, whereby said leg is supported by a thicker portion of said base plate, and wherein said leg is positioned for holding an object; and a second leg extending from said base plate below said center to form a pair of legs, wherein said pair of legs forms a U-shape for holding said object; wherein each of said legs has a distal portion and at least one stop between said base plate and said distal portion wherein said leg and said second leg extend from said thicker portion, said at least two openings are located on a comparatively recessed portion of said base plate, said U-shape formed by said legs includes a portion joining said legs that includes at least a portion having a thickness greater than said thicker portion and a generally continuous surface on an inner side of said U-shape, and said thicker portion is larger than said comparatively recessed portion.

2. A holder assembly according to claim 1, wherein each of said openings engages said head of said corresponding fastener.

3. A holder assembly according to claim 1, wherein each of said drywall fasteners further comprises a recess for a rotary driver and a screw-like drilling portion capable of drilling into a stud.

4. A holder assembly according to claim 1, wherein said pair of legs are generally aligned in a horizontal plane, and are generally symmetrical.

5. A holder assembly according to claim 1, wherein each of said legs has a foot.

6. A holder assembly according to claim 5, wherein each of said legs has at least one groove between said base plate and said foot.

7. A holder assembly according to claim 1, wherein said holder is cast from zinc.

8. A holder assembly according to claim 1, wherein each of said drywall fasteners comprises a solid body and has a drilling portion having a length longer than a thickness of said friable substrate.

9. A holder according to claim 1, said base plate further comprising a rearwardly projecting tang above at least one hole to pre-position the holder on a wall surface.

10. A holder assembly according to claim 1, wherein said base plate has a longitudinal axis, and wherein said center, said openings and said leg are all aligned with said axis.

11. A holder mountable to drywall and a stud, comprising:

a self-drilling drywall fastener having an axis, a solid body, a screw-like drilling portion having a length longer than a thickness of said drywall and a high-threaded drywall engaging proximal portion, and an enlarged head, wherein said high-threaded proximal portion has threading having a crest diameter of at least about ¼ inch;

a wall-contacting base plate substantially wider than a largest outside diameter of said proximal portion, wherein said base plate has a center and a pair of openings located above said center, each of said openings being capable of receiving a threaded drywall fastener and engaging the head thereof; and a U-shaped pair of legs for holding an object, wherein each one of said legs extends from a thicker portion of said base plate, below said center of said base plate to a distal portion having a foot;

wherein said U-shape includes a portion joining said legs that includes at least a portion having a thickness greater than said thicker portion and a generally continuous surface on an inner side of said U-shape;

and further wherein a portion of each one of said legs is surrounded on a plurality of sides by said thicker portion.

12. A holder mountable to a friable substrate, comprising:

a generally flat base plate having a generally oval peripheral shape having a center, said base plate having a thicker portion and a recessed area, wherein said thicker portion is larger than said recessed area, an opening formed in said recessed area, said opening being located above said center to receive a drywall fastener, wherein said opening is large enough to admit passage of a fastener having threading with a crest diameter of at least about ¼ inch, and a leg extending from said thicker portion of said base plate, whereby a portion of said leg is supported and surrounded on a plurality of sides by said thicker portion, wherein said leg is positioned below said center for holding an object and wherein said leg has an enlarged foot at a distal end of said leg;

a second leg extending from said thicker portion of said base plate to form a pair of legs, wherein said pair of legs form a U-shape for holding said object, said U-shape including a portion joining said legs that includes at least a portion having a thickness greater than said thicker portion and a generally continuous surface on an inner side of said U-shape.

13. A holder according to claim 12, said base plate further comprising a rearwardly projecting tang to pre-position the holder on a wall surface.

14. A holder according to claim 12, wherein said base plate has a longitudinal axis, and wherein said center, said opening and said leg are all aligned with said axis.

15. A holder according to claim 12, further comprising a second opening formed in said recessed area of said base plate, wherein each opening is capable of receiving a drywall fastener.

16. A holder according to claim 14, wherein said pair of legs are generally aligned in a common plane.

17. A holder according to claim 12, wherein said pair of legs are generally symmetrical about said axis.

18. A holder according to claim 12, wherein each of said legs has a foot.

19. A holder according to claim 12, wherein each of said legs further comprises at least one stop between said base plate and said foot.

20. A holder according to claim 12, wherein said holder is cast from zinc.

* * * * *